Patented Apr. 6, 1954

2,674,518

UNITED STATES PATENT OFFICE 2,674,518

PREPARATION OF URANIUM TETRAFLUORIDE

E. Charles Evers and Myron B. Reynolds, Providence, R. I., assignors to the United States of America as represented by the United States Atomic Energy Commission No Drawing. Application February 20, 1946, Serial No. 649,125

11 Claims. (Cl. 23—14.5)

This invention relates to a process for preparing uranium tetrafluoride. More particularly, it relates to a new and improved process of preparing uranium tetrafluoride by reacting an oxide of uranium with a fluorochloroparaffinic hydrocarbon.

Various methods are known for the preparation of uranium tetrafluoride. For example, the carbide of uranium has been reacted with free fluorine, and while some uranium tetrafluoride was formed, the reaction tends to produce uranium hexafluoride. In addition, it is difficult to handle the free fluorine. The major portion of the uranium tetrafluoride produced today is prepared by reacting hydrogen fluoride with an oxide of uranium. This method, while in wide-scale use is subject to the objection that hydrogen fluoride is a highly corrosive, poisonous gas and difficult to handle. Furthermore when using hydrogen fluoride a quantitative yield of uranium tetrafluoride can only be obtained by employing uranium dioxide. When using either uranium tritaoctaoxide or uranium trioxide with hydrogen fluoride, uranyl fluoride along with uranium tetrafluoride is produced.

It is therefore the object of this invention to provide a process to prepare uranium tetrafluoride in quantitative yields by reacting an oxide of uranium with a fluorinating agent which is safe, convenient, readily-available and efficient.

It is a further object of the invention to produce substantially quantitative yields of uranium tetrafluoride regardless of the state of oxidation of the uranium employed as one of the reactants.

Now, in accordance with this invention, a method has been found for preparing uranium tetrafluoride by reacting an oxide of uranium with a fluorochloroparaffinic hydrocarbon, such as tetrafluorodichloroethane, at elevated temperatures, for example within the range of from about 350° C. to about 700° C. The product so produced is uranium tetrafluoride of a uniform green color, having a bulk density varying from about 1.9 to 3.65.

Now, having indicated in a general way, the nature and purpose of this invention, the following examples and tables will illustrate the invention. It is to be understood, however, that such examples are presented merely as illustrations of the invention and are not to be construed as limiting the same. In the examples the ingredients are given by weight, unless otherwise indicated.

EXAMPLE I

A calcium fluoride reaction boat, fired at 1300° C. contained in a heat-resistant glass tube, heated electrically by a split-refractory type furnace, was charged with a 10–15 gram charge of uranium trioxide. The uranium trioxide was dried by heating at 200–300° C. in a stream of dry nitrogen. Tetrafluorodichloroethane gas, which had been dried by passing through tubes packed with phosphorus pentoxide, was introduced into the glass tube and the temperature was raised rapidly over a period of from about 15 to 25 minutes to a temperature of about 625° C. and maintained for 1 hour and 30 minutes at a temperature of about 650° C. Uranium tetrafluoride was thus produced, having a bulk density of 3.2. The recovery of uranium tetrafluoride was substantially quantitative as the reaction product contained only 0.30% of water-soluble uranium product.

EXAMPLE II

A polished graphite reaction boat, contained in a heat-resistant glass tube, heated electrically by a split-refractory type furnace, was charged with a 10–15 gram charge of uranium trioxide. The uranium trioxide was dried by heating at 200–300° C. in a stream of dry nitrogen. Tetrafluorodichloroethane gas, which had been dried by passing through tubes packed with phosphorus pentoxide, was introduced into the glass tube and the temperature raised rapidly over a period of from about 15 to 25 minutes to a temperature of about 625° C. and maintained for 2 hours at a temperature of about 650° C. Uranium tetrafluoride was produced having a bulk density of 3.3. The recovery of uranium tetrafluoride was substantially quantitative as the reaction product contained only 0.27% of water-soluble uranium product.

EXAMPLE III

Example II was repeated, except a temperature of 650° C. was maintained for 3 hours. Uranium tetrafluoride having a bulk density of 3.65 was thus produced in substantially quantitative yield, as the reaction product contained only 0.43% of water-soluble uranium product.

EXAMPLE IV

Example II was repeated, except a temperature of 650–700° C. was maintained for 1 hour. Uranium tetrafluoride having a bulk density of 2.94 was produced in substantially quantitative yield as the reaction product contained only 0.27% of water-soluble uranium product.

EXAMPLE V

Example II was repeated except uranium tritaoctaoxide was used as the uranium oxide, and a temperature of 685–700° C. was maintained for 3 hours. Uranium tetrafluoride was produced having a bulk density of 3.2. The recovery of uranium tetrafluoride was substantially quantitative as the reaction product contained only 0.23% of water-soluble uranium product.

EXAMPLE VI

Example II was repeated except uranium dioxide was used as the uranium oxide, and a temperature of 675–700° C. was maintained for 1 hour and 30 minutes. Uranium tetrafluoride was produced having a bulk density of 2.40. The recovery of uranium tetrafluoride was substantially quantitative as the reaction product contained only 0.26% of water-soluble uranium product.

EXAMPLE VII

A series of runs were conducted wherein uranium tetrafluoride was prepared successfully by passing tetrafluorodichloroethane (known commercially as "Freon-114") over oxides of uranium at a temperature ranging between 675° to 700° C. The runs were carried out in a rotating kiln type of reactor made of graphite, while a split-tube refractory furnace was employed for heating. Uranium trioxide was used as the uranium oxide in all of the runs, except in run #8, wherein uranium tritaoctaoxide was used. Oxide charges weighing between 40 and 60 grams were employed in the runs. After the charge was introduced, the system was sealed, evacuated to remove air, filled with dry and purified nitrogen and heated to 400° C. Nitrogen was passed through the system for 15 minutes at 400° C. to expel moisture. A stream of tetrafluorodichloroethane (15 cc./sec.) was then substituted for the nitrogen and the system was raised rapidly to the temperature shown in Table 1. After cooling (with tetrafluorodichloroethane running through the reactor during cooling) the reactor was opened and the product examined. The product produced was uranium tetrafluoride, which was uniformly green in color. The bulk density of the resulting product varied from <1.9 to 3.0. It was noted that in runs #5 and #6, when finely ground oxide was used, i. e. 100 F., the bulk densities were <1.9 compared with a higher average value for the other products.

*Table 1*

| Run No. | Reaction Time, Hours | Furnace Temp., ° C. | Reactor Temp., ° C. | Percent Uranium in Product |
|---|---|---|---|---|
| 1 | 2.0 | 810 | 675 | 75.77 |
| 2 | 1.5 | 815 | 675 | 75.91 |
| 3 | 2.0 | 830 | 700 | 75.63 |
| 4 | 1.0 | 830 | 700 | 75.85 |
| 5 | 1.0 | 830 | 690 | 75.73 |
| 6 | 1.0 | 830 | 700 | 75.78 |
| 7 | 1.0 | 830 | 695 | 75.94 |
| 8 | 2.0 | 830 | 695 | 75.64 |
| Theoretical | | | | 75.80 |

EXAMPLE VIII

A series of runs were carried out wherein uranium tetrafluoride was prepared by reacting uranium dioxide with difluorodichloromethane according to the method of Example 1. The results, together with conditions of reaction are shown herewith in Table 2.

*Table 2*

| Run No. | Conditions of Temp., ° C. | Reaction Time, Hrs. | Type Boat | Percent Soluble Uranium | Bulk Density |
|---|---|---|---|---|---|
| 9 | 350 | 8 | CaF₂ | 2.62 | 2.4 |
| 10 | 350 | 8 | Polished Graphite | 1.18 | 2.0 |
| 11 | 450–475 | 1 | Pyrex | 1.37 | 2.9 |
| 12 | 600 | 2 | Polished Graphite | 0.97 | 2.3 |

EXAMPLE IX

In addition to the use of tetrafluorodichloroethane and difluorodichloromethane, other runs were conducted with additional fluororuns were conducted with additional fluorochloroparaffinic hydrocarbons, such as fluorotrichloromethane, trifluorotrichloroethane, fluorodichloromethane and the like. These runs are shown in the following Table 3.

*Table 3*

| Oxide of Uranium | Fluorochloro Paraffinic Hydrocarbon | Preferred Temperature, ° C. |
|---|---|---|
| Uranium tritaoctaoxide | difluorodichloromethane | 400 |
| Uranium trioxide | do | 400 |
| Uranium dioxide | fluorotrichloromethane | 400 |
| Uranium trioxide | do | 400 |
| Uranium dioxide | trifluorotrichloroethane | 600–650 |
| Uranium trioxide | do | 600–650 |
| Uranium dioxide | fluorodichloromethane | 600 |

From the foregoing examples, a method of preparing uranium tetrafluoride has been illustrated wherein an oxide of uranium, such as uranium dioxide, uranium trioxide, or uranium tritaoctaoxide was reacted with a fluorochloro paraffinic hydrocarbon, such as difluorodichloromethane, tetrafluorodichloroethane, fluorotrichloromethane, fluorodichloromethane and trifluorotrichloroethane at elevated temperatures, preferably within the range of from about 350° C. to about 700° C.

It will be noted from the examples that the type reactor suitable for carrying out the fluorination may vary, and while a heat-resistant stationary glass tube was used in Example I, if agitation of the oxide during the reaction is preferred, a rotating kiln type of reactor, such as was used in Example VII may be employed.

Various types of reaction boats may be used to hold the charge, but it is preferable to use one which is substantially nonreactive under reaction conditions. Boats constructed of heat-resistant glass, such as Pyrex, calcium fluoride fired at about 1300° C. and polished graphite have been found to be satisfactory.

It is important that the reaction be carried out under anhydrous conditions. While a method of drying both the oxide and the fluorinating agent is illustrated in Example I, it will be understood that any other known method of drying the reactants may be employed.

The reaction temperatures vary somewhat with the particular oxide of uranium used, and the particular fluorinating agent. While in all cases it is necessary to employ an elevated temperature, a temperature within the range of from about 350° C. to about 700° C. has been found satisfactory.

By practicing this invention, uranium tetrafluoride may be prepared in substantially quantitative yields. The uranium tetrafluoride does not adhere to the boats and the gaseous reactants and products do not corrode the materials of which the reactor is constructed. The overall time efficiency of the process is equal to or superior to that of existing processes, and the reaction proceeds rapidly to completion, the reaction being relatively independent of whether a small or large charge of oxide is employed.

It is to be understood that the above particular description is by way of illustration, and that changes, omissions, additions, substitutions, and/or modifications might be made within the scope of the claims without departing from the spirit of the invention which is intended to be limited only as required by prior art.

We claim:

1. The process of preparing uranium tetrafluoride which comprises reacting an oxide of uranium with a fluorochlorocarbon selected from the group consisting of tetrafluorodichloroethane and dichlorodifluoromethane at a temperature within the range of from about 350° C. to about 700° C., and recovering the uranium tetrafluoride thereby produced.

2. The process as defined in claim 1 in which the oxide of uranium which is reacted is uranium dioxide.

3. The process as defined in claim 1 in which the oxide of uranium which is reacted is uranium trioxide.

4. The process as defined in claim 1 in which the oxide of uranium which is reacted is uranium tritaoctaoxide.

5. The process of preparing uranium tetrafluoride comprising reacting an oxide of uranium with tetrafluorodichloroethane at a temperature within the range of from about 350° C. to about 700° C., and recovering the uranium tetrafluoride thereby produced.

6. The process of preparing uranium tetrafluoride comprising reacting uranium dioxide with tetrafluorodichloroethane at a temperature within the range of from about 350° C. to about 700° C., and recovering the uranium tetrafluoride thereby produced.

7. The process of preparing uranium tetrafluoride comprising reacting uranium trioxide with tetrafluorodichloroethane at a temperature within the range of from about 350° C. to about 700° C., and recovering the uranium tetrafluoride thereby produced.

8. The process of preparing uranium tetrafluoride comprising reacting uranium tritaoctaoxide with tetrafluorodichloroethane at a temperature within the range of from about 350° C. to about 700° C., and recovering the uranium tetrafluoride thereby produced.

9. The process of preparing uranium tetrafluoride comprising reacting an oxide of uranium with dichlorodifluoromethane at a temperature within the range of from about 350° C. to about 700° C., and recovering the uranium tetrafluoride thereby produced.

10. The process of preparing uranium tetrafluoride comprising reacting uranium dioxide with dichlorodifluoromethane at a temperature within the range of from about 350° C. to about 700° C., and recovering the uranium tetrafluoride thereby produced.

11. The process of preparing uranium tetrafluoride comprising reacting uranium trioxide with dichlorodifluoromethane at a temperature within the range of from about 350° C. to about 700° C., and recovering the uranium tetrafluoride thereby produced.

References Cited in the file of this patent

"Hackh's Chemical Dictionary," 2nd edition, pp. 586–7, 1937. (Copy in Division 59.)

Booth et al., Journal of the American Chemical Society, volume 68, pages 1969 and 1970 (October, 1946). (Submitted January 13, 1943; states that work was done in 1940–1. Copy in Sci. Lib.)